US010951639B2

(12) United States Patent
Periaswamy et al.

(10) Patent No.: US 10,951,639 B2
(45) Date of Patent: Mar. 16, 2021

(54) SYSTEMS, METHODS AND COMPUTER PROGRAM PRODUCTS FOR ANOMALY DETECTION

(71) Applicant: Yokogawa Electric Corporation, Tokyo (JP)

(72) Inventors: Subramanian Periaswamy, Bangalore (IN); Sunil Ramanna Keri, Bangalore (IN); Nabil Ahmed Syed, Bangalore (IN)

(73) Assignee: Yokogawa Electric Corporation, Tokyo (JP)

( * ) Notice: Subject to any disclaimer, the term of this patent is extended or adjusted under 35 U.S.C. 154(b) by 196 days.

(21) Appl. No.: 16/140,711

(22) Filed: Sep. 25, 2018

(65) Prior Publication Data

US 2019/0098035 A1 Mar. 28, 2019

(30) Foreign Application Priority Data

Sep. 28, 2017 (IN) .............................. 201741034569

(51) Int. Cl.
*H04L 29/06* (2006.01)
*G05B 19/418* (2006.01)
(Continued)

(52) U.S. Cl.
CPC ........ *H04L 63/1425* (2013.01); *G05B 19/048* (2013.01); *G05B 19/0428* (2013.01); *G05B 19/4184* (2013.01); *G05B 23/0213* (2013.01); *G05B 23/0254* (2013.01); *G06N 20/00* (2019.01); *G05B 17/02* (2013.01); *G05B 2219/45103* (2013.01)

(58) Field of Classification Search
CPC ................ H04L 63/1425; G06N 20/00; G05B 19/0428; G05B 19/048; G05B 19/4184; G05B 23/0213; G05B 23/0254
See application file for complete search history.

(56) References Cited

U.S. PATENT DOCUMENTS 9,516,053 B1 * 12/2016 Muddu .................. G06N 5/022

OTHER PUBLICATIONS

Kim et al. (Convolutional Neural Network-Based Human Detection in Nighttime Images Using Visible Light Camera Sensors, Sensors 2017, 17, Published: May 8, 2017, 26 pages) (Year: 2017).*

* cited by examiner

Primary Examiner — Oleg Korsak
(74) Attorney, Agent, or Firm — Sughrue Mion, PLLC

(57) ABSTRACT

A method for anomaly detection in process control environments is provided. The method includes receiving a first information from first field devices located within a process control environment, and transmitting a first vector based on the first information, to a first detector implemented within an edge node that provides gateway access to the environment. The first detector implements a first classifier model. When the first detector detects an anomaly event based on the first vector, a second vector is transmitted to a second detector implemented within a cloud based server. The second vector, different from the first vector, is generated based on second information from second field devices located within the process control environment. The second detector implements a second classifier model different from the first classifier model. An anomaly event alert is generated when one of the first detector and the second detector detects an anomaly event.

21 Claims, 8 Drawing Sheets

(51) Int. Cl.
*G05B 23/02* (2006.01)
*G05B 19/048* (2006.01)
*G06N 20/00* (2019.01)
*G05B 19/042* (2006.01)
*G05B 17/02* (2006.01)

SYSTEMS, METHODS AND COMPUTER PROGRAM PRODUCTS FOR ANOMALY DETECTION

FIELD OF THE INVENTION

The invention relates to the field of industrial automation and plant control. In particular, the invention relates to intelligent process control systems for detecting anomalies or error events within a process environment.

BACKGROUND

Process control systems seek to implement comprehensive and cost effective strategies for improving process efficiencies and controlling product output quality. In absence of continuous monitoring of a process environment, process deviations or anomalies within the process environment can result in catastrophic consequences either in terms of damage suffered by the process environment, or in terms of failure to maintain product or process quality (which failures may eventually only be detected during product quality control testing—by which time significant irrecoverable expenditures of manufacturing and manpower resources have already been made).

Industrial plants respond to this need by implementing solutions such as a distributed control system (DCS) to control process operations by the use of control elements placed throughout the process environment. The DCS may be connected to various field devices such as measurement and control devices for pressure, temperature and flow in order to measure various parameters related to a process environment. The DCS is operated by operators who monitor real-time values transmitted from field devices and control these devices and the process environment. The DCS may also rely on field operators who perform various tasks in physical equipment present in the industrial plant, and are responsible for identifying risks and mitigating them in physical equipment present in the plant.

A significant drawback with approaches such as the one described above is that they rely on human monitoring and human attention to potential anomalies or error events, to determine whether readings from field devices/sensors are in fact reflective of an error state. Given the size of process environments within a typical industrial plant and given the complexity of equipment involved, this is increasingly difficult to ensure.

There is accordingly an on-going need in the process control industry for reducing the reliance on human intervention for detecting error states, and for improving machine intelligence based detection of anomalies and error states within process environments.

Further, previous solutions for implementing machine intelligence based anomaly detection have typically relied on centralized server based implementations of classifier algorithms—which have a large computing footprint, and result in significant communication overhead arising from bandwidth requirements for ensuring real time data communication between field devices within the process environment and classifier models implemented on the centralized server or cloud.

While edge computing offers potential solutions for reducing communication overhead in comparison with a typical cloud based server-client model, the overall computing overheads (especially processor and memory overheads) involved in implementing machine learning methods at edge nodes makes such implementations unrealistic and difficult to achieve and replicate at each edge node.

There is accordingly also a requirement for machine learning based anomaly detection solutions that reduce the overall computing overheads while simultaneously improving accuracy of such anomaly detection.

SUMMARY

The invention provides systems and methods for detection of anomaly events or error events within a process environment by implementing a hybrid of centralized classifier models and edge node based classifier models.

The invention includes a method for anomaly detection in process control environments. The method comprises the steps of (i) receiving a first set of information from a first set of field devices located within a process control environment, (ii) transmitting a first input vector generated based on the first set of information, to a first anomaly detector implemented within an edge node configured to provide gateway access to said process control environment, wherein said first anomaly detector implements a first classifier model, (iii) responsive to the first anomaly detector detecting an anomaly event based on the transmitted first input vector, transmitting a second input vector to a second anomaly detector implemented within a cloud based server, wherein, (a) the second input vector is generated based on a second set of information received from a second set of field devices located within the process control environment, (b) the second input vector is different from the first input vector, and (c) the second anomaly detector implements a second classifier model, wherein said second classifier model is different from the first classifier model, and (iv) generating an anomaly event alert responsive to at least one of the first anomaly detector and the second anomaly detector detecting an anomaly event.

The second classifier model may be different from the first classifier model in terms of any one or more of classification accuracy, classification precision, classification sensitivity, F-score, classification specificity, area under the curve, average accuracy or error rate. In another embodiment, the second classifier model may be different from the first classifier model in terms of any one or more of run time overhead, communication overhead, data transfer overhead, size overhead, encoding overhead, data structure overhead, or run time complexity.

The first classifier model may in an embodiment comprise a machine learning ensemble based classifier model. In a specific embodiment, the machine learning ensemble based classifier model is a random forest classifier.

The second classifier model may comprise a deep learning architecture based classifier model. In a specific embodiment, the deep learning architecture based classifier model is a convolutional neural network.

In a further method embodiment, the first input vector comprises temperature values received from a plurality of thermal sensors or infrared sensors, and the second input vector comprises image information.

The image information may represent any one of a thermal image, an infrared image or a heat map.

The invention additionally provides a method for configuring an anomaly detection system for process control environments, said system comprising at least a first processor implemented classifier model located at a first edge node, a second processor implemented classifier model located at a second edge node, and a third processor implemented classifier model located at a cloud based central server, wherein each of said first, second and third processor implemented classifier models is configured to detect anomaly events within process control environments. The method comprises the steps of (i) receiving a first set of information from a first set of field devices located within a process control environment, (ii) transmitting a first input vector generated based on the first set of information, to the first processor implemented classifier model located at the first edge node, and (iii) responsive to the first processor implemented classifier model detecting an anomaly event based on the transmitted first input vector, modifying the classification parameters of the second processor implemented classifier model.

In a more specific method embodiment, modification of the classification parameters of the second processor implemented classifier model is subject to the third processor implemented classifier model detecting an anomaly event within said process control environment. Additionally, both of the first processor implemented classifier model and the second processor implemented classifier model may be configured to detect anomaly events of a common anomaly event type.

The classification parameters of the second processor implemented classifier model may be modified such that the second processor implemented classifier model is configured to detect an anomaly event in response to receiving the first input vector as an input to the second processor implemented classifier model.

The invention additionally relates to A system for anomaly detection in process control environments. The system comprises (i) at least one processor implemented edge node configured to provide gateway access to a process control environment, wherein the at least one processor implemented edge node is further configured to (a) receive a first set of information from a first set of field devices located within the process control environment, and (b) provide to a first anomaly detector implemented within said processor implemented edge node, a first input vector based on the first set of information, wherein said first anomaly detector implements a first classifier model, (ii) at least one cloud based server that is communicably coupled to the at least one processor implemented edge node, wherein said cloud based server is configured to respond to the first anomaly detector detecting an anomaly event based on the transmitted first input vector, by providing a second input vector to a second anomaly detector implemented within said cloud based server, wherein (c) the second input vector is generated based on a second set of information received from a second set of field devices located within the process control environment, (d) the second input vector is different from the first input vector, and (e) the second anomaly detector implements a second classifier model, wherein said second classifier model is different from the first classifier model, and (iii) a processor implemented alert engine, configured to generate an anomaly event alert responsive to at least one of the first anomaly detector and the second anomaly detector detecting an anomaly event.

The second classifier model of the system may be different from the first classifier model in terms of any one or more of classification accuracy, classification precision, classification sensitivity, F-score, classification specificity, area under the curve, average accuracy or error rate. The second classifier model is another embodiment of the system, different from the first classifier model in terms of any one or more of run time overhead, communication overhead, data transfer overhead, size overhead, encoding overhead, data structure overhead, or run time complexity.

In a specific embodiment, the first classifier model is a machine learning ensemble based classifier model. The machine learning ensemble based classifier model may comprise a random forest classifier.

In an embodiment of the system, the second classifier model is a deep learning architecture based classifier model. The deep learning architecture based classifier model may comprise a convolutional neural network.

In a further embodiment of the system, the first input vector comprises temperature values received from a plurality of thermal sensors or infrared sensors, and the second input vector comprises image information.

The image information may represent any one of a thermal image, an infrared image or a heat map.

The invention provides an alternate embodiment comprising a system for configuring an anomaly detection system for process control environments. The system comprises (i) a first processor implemented classifier model located at a first edge node, (ii) a second processor implemented classifier model located at a second edge node, and (iii) a third processor implemented classifier model located at a cloud based central server, wherein each of said first, second and third processor implemented classifier models is configured to detect anomaly events within process control environments, and wherein the system is configured to (a) receive a first set of information from a first set of field devices located within a process control environment, (b) transmit a first input vector generated based on the first set of information, to the first processor implemented classifier model located at the first edge node, and (c) responsive to the first processor implemented classifier model detecting an anomaly event based on the transmitted first input vector, modify the classification parameters of the second processor implemented classifier model.

In an embodiment of the system, modification of the classification parameters of the second processor implemented classifier model is subject to the third processor implemented classifier model detecting an anomaly event within said process control environment.

Further, both of the first processor implemented classifier model and the second processor implemented classifier model may be configured to detect anomaly events of a common anomaly event type.

In an embodiment, the classification parameters of the second processor implemented classifier model may be modified such that the second processor implemented classifier model is configured to detect an anomaly event in response to receiving the first input vector as an input to the second processor implemented classifier model.

The invention additionally provides computer program products for implementing one or more of the methods discussed hereinabove, the computer program product comprising a non-transitory computer readable medium having computer readable program code embodied thereon, the computer readable program code comprising instructions for implementing the steps of said one or more methods.

BRIEF DESCRIPTION OF THE ACCOMPANYING DRAWINGS

DETAILED DESCRIPTION

The present invention relies on edge computing as a means for implementing effective and intelligent systems for anomaly detection within a process environment.

For the purposes of the present invention 'edge computing' shall be understood as referring to computing infrastructure that is located close to the sources of data (e.g. industrial machines, industrial controllers, and equipment/sensors from which data is aggregated. Edge computing optimizes cloud computing systems by processing data at the edges of the network (i.e. near the sources of data)—which results in reduction of the communication overhead (the communication bandwidth needed between sensors/field devices and the central datacenter) by performing analytics and knowledge generation relatively near to the data source.

The term 'edge node(s)' shall be understood as referring to gateway points between the cloud and each industrial plant. Examples of edge nodes include any node with a network interface requiring IP connectivity, any processor or computer, any network access point or any network gateway.

For the purposes of the present invention 'Field devices' or 'sensors' shall be understood to include any field devices or sensors implemented within a process environment, including without limitation temperature sensors, pressure sensors, flow sensors, level sensors, proximity sensors, displacement sensors, biosensors, image sensors, electromagnetic radiation sensors, gas sensors, chemical sensors, acceleration sensors, moisture sensors, humidity sensors, tilt sensors, force sensors, mass sensors and viscosity sensors.

For the purposes of the invention, the term 'industrial plant' shall be used to denote any process environment, including an entire industrial plant, or a sub-unit thereof.

For the purposes of the present invention, the term 'overhead' may be understood as any combination of excess or indirect computation time, memory, bandwidth or other computing related resources that are required to perform a specific task.

It has been found that implementing intelligent systems for anomaly detection within a process environment using edge computing, and more particularly using a hybrid centralized server-edge computing model in accordance with the teachings of the present invention, offers several surprising advantages and efficiencies.

The present invention seeks to implement systems and methods for detection of anomaly events or error events within a process environment by implementing a hybrid of centralized classifier models and edge node based classifier models.

Figure 1:
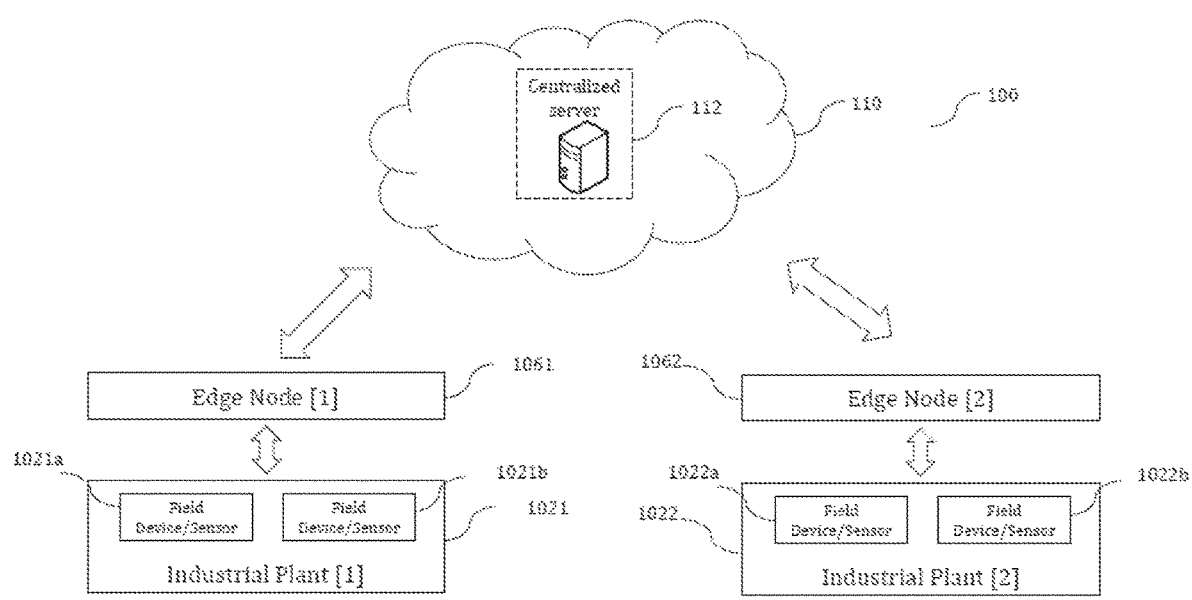
FIG. 1 illustrates a system for process environment monitoring using an intelligent cloud based centralized server.

FIG. 1 illustrates a conventional edge computing based system 100 of a type that may be used for controlling or monitoring process environments within industrial plants. System 100 comprises a first industrial plant 1021 and a second industrial plant 1022. First industrial plant 1021 has a plurality of field devices or sensors (1021a and 1021b) implemented therein, while second industrial plant 1022 has a plurality of field devices or sensors (1022a and 1022b) implemented therein. First industrial plant 1021 is communicatively coupled to cloud 110 through a first edge node 1061, while second industrial plant 1062 is communicatively coupled to cloud 110 through a second edge node 1062. System 100 may additionally include centralized server 112 located within cloud 110, which centralized server 112 may be configured for implementing centralized administrative tasks such as provisioning of edge nodes, control of said edge nodes etc.

Figure 2:
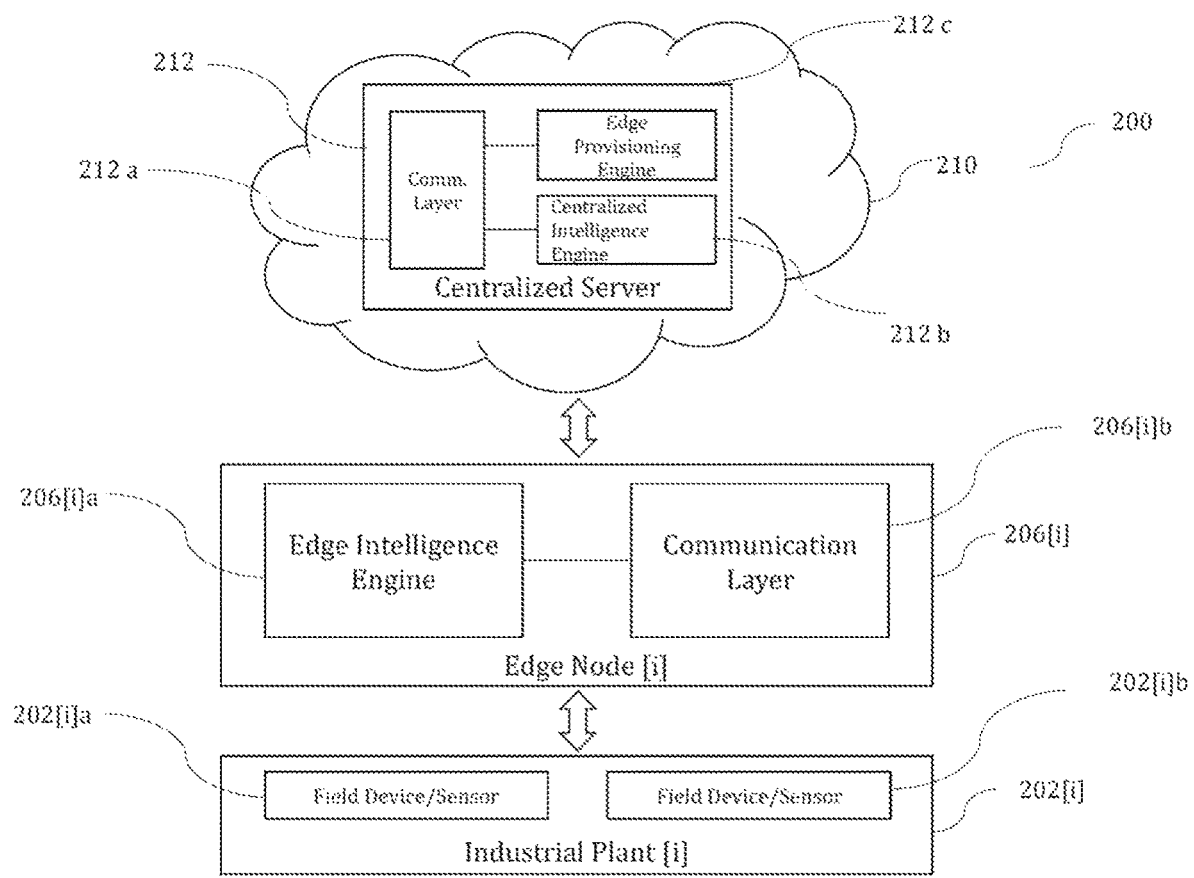
FIGS. 2 and 3 illustrate systems for process environment monitoring which uses intelligent edge nodes.

FIG. 2 illustrates functional components of an edge node implementation of a system 200 for controlling or monitoring process environments within industrial plants.

System 200 includes an industrial plant 202[i] having a plurality of field devices or sensors (202[i]a and 202[i]b) implemented therein. Industrial plant 202[i] is communicatively coupled to cloud 210 through edge node 206[i]. System 200 additionally includes centralized server 212 located within cloud 210.

Edge node 206[i] comprises edge intelligence engine 206[i]a and communication layer 206[i]b. Edge intelligence engine 206[i]a comprises a processor implemented intelligence engine which may be configured to implement the process monitoring functionality or the process control functionality that is sought to be implemented through edge node 206[i]. Communication layer 206[i]b may be configured to enable edge node 206[i] to communicate with cloud 210 and with industrial plant 202[i].

Centralized server 212 comprises communication layer 212a, centralized intelligence engine 212b and edge provisioning engine 212c. Communication layer 212a may be configured to enable centralized server 212 to communicate with various edge nodes (for example edge node 206[i]) as well as with other networked entities through cloud 210.

Edge provisioning engine 212c may be configured to implement various edge node provision services, such as adding or removing edge nodes, maintaining a master list of valid edge nodes and their respective capabilities, and enabling peer-to-peer communications between edge nodes.

Centralized intelligence engine 212b may be configured to implement one or more intelligence based functions that may be required from centralized server 212 (for example, security functions, analysis of data received from an edge node etc.).

Figure 3:
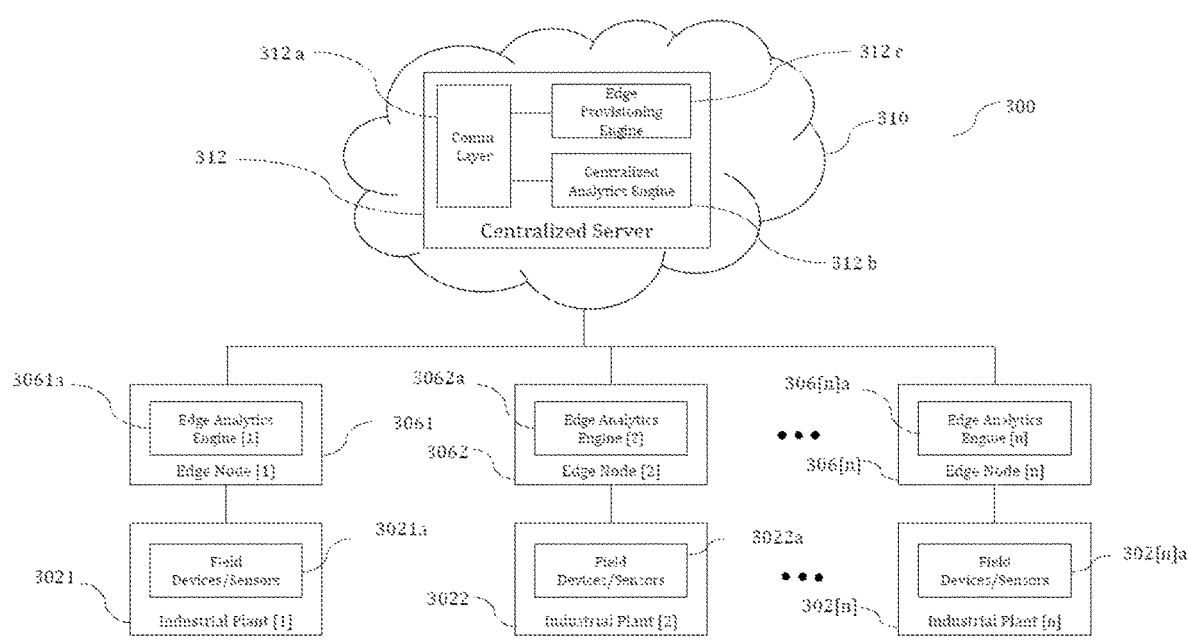

FIG. 3 illustrates a system 300 configured to implement a hybrid 'centralized server and edge node' based computing model for the purposes of anomaly detection within process environments.

System 300 includes a plurality of industrial plants 3021, 3022 to 302[n], each having a plurality of field devices or sensors (3021a and 3021b, 3022a and 3022b, up to 302[n]a and 302[n]b) implemented therein. Each of first industrial plant 3021, second industrial plant 3022 up to industrial plant 302[n] are communicatively coupled to cloud 310 respectively through edge nodes 3061, 3062 up to 306[n]. Each edge node (3061, 3062 up to 306[n]) respectively comprises an edge analytics engine (3061a, 3062a up to 306[n]a) which may in an embodiment be configured to implement an edge node based anomaly detection function through one or more processor implemented classifier models. It would be understood, that while not specifically included in the illustrated edge nodes, each of said edge nodes may include a corresponding communication layer.

System 300 additionally includes centralized server 312 located within cloud 310. Centralized server 312 comprises communication layer 312a, centralized analytics engine 312b and edge provisioning engine 312c. Communication layer 312 may be configured to enable centralized server 312 to communicate with various edge nodes (for example edge nodes 3061 to 306[n]) as well as with other networked entities through cloud 310.

Edge provisioning engine 312c may be configured to implement various edge node provision services, such as adding or removing edge nodes, maintaining a master list of valid edge nodes and their respective capabilities, and enabling peer-to-peer communications between edge nodes. In an embodiment, edge provisioning engine 312c may additionally maintain information regarding the identity, type(s) and capabilities of anomaly detection engines or classifier models that have been implemented on each edge node, and also the types of anomalies said anomaly detection engines or classifier models are configured to detect.

Centralized analytics engine 312b may be configured to implement a centralized server based anomaly detection function (which function is different or distinct from the edge node based anomaly detection function implemented at each edge node) through one or more processor implemented classifier models (which one or more classifier models may be different from the one or more processor implemented classifier models within each edge node).

The configuration and functionality of the processor implemented classifier models at the centralized server and at the edge nodes are discussed in more detail below in connection with FIGS. 4 to 7. It would be understood that said classifier models may be configured to implement any one or more of the methods of FIGS. 4 to 7.

Figure 4:
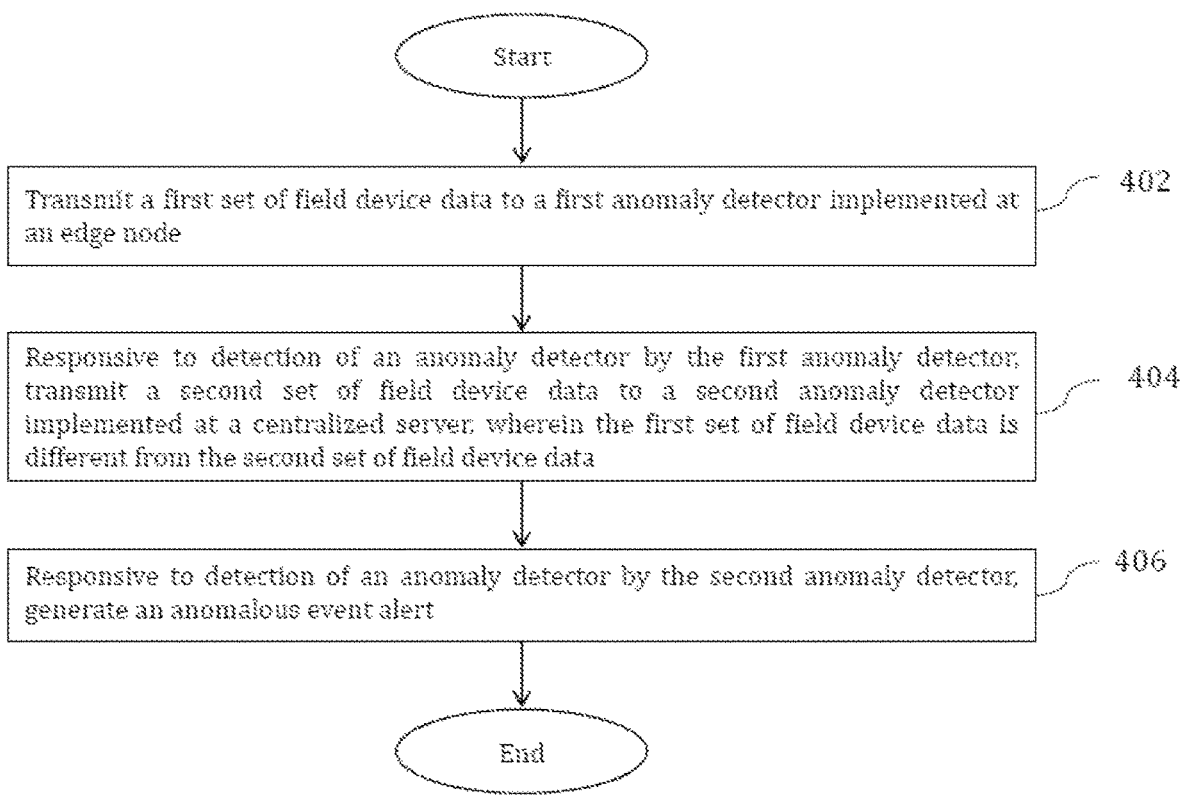
FIGS. 4 to 7 illustrate various embodiments of methods in accordance with the present invention.

FIG. 4 illustrates a method in accordance with the present invention.

FIG. 402 comprises transmitting a first set of field device data to a first anomaly detector implemented at an edge node. The first set of field device data comprises (or is derived from) data generated at a first set of field devices. In an embodiment, said first set of field devices comprises sensors or field devices implemented within an industrial plant.

In an embodiment, the first anomaly detector implemented at an edge node comprises a first processor implemented classifier model configured to detect anomaly events or error states in a process control environment (e.g. in the industrial plant). The first processor implemented classifier model may further be configured to detect said anomaly events or error states based on data received from the first set of field devices. In another embodiment, the first anomaly detector may additionally be configured to classify the detected one or more anomaly events according to anomaly type or error state type (for example, into any one of a predefined set of anomaly types or error state types). For example, the first classifier model may be configured to identify any leak detected within the process control environment as an anomaly event, and additionally may be configured to classify the detected leak as one of a steam leak, methane leak or a carbon dioxide leak.

At step 404, responsive to detection of an anomaly event by the first anomaly detector, a second set of field device data is transmitted to a second anomaly detector implemented at a centralized server that is implemented within (or that is communicably coupled to the process control environment through) the cloud. The second set of field device data comprises sensor data generated by a second set of field devices. In an embodiment, said second set of field devices comprises sensors or field devices implemented within said industrial plant. In a more particular embodiment, the second set of field devices is distinct (or different) from the first set of field devices.

The second anomaly detector implemented at the centralized server comprises a second processor implemented classifier model configured to detect anomaly events or error states in a process control environment (e.g. in the industrial plant), and further configured to detect said anomaly events or error states based on data received from the second set of field devices. In another embodiment, the second anomaly detector may additionally be configured to classify the detected anomaly event into one of a predefined set of anomaly types.

At step 406, responsive to detection of an anomaly event by the second anomaly detector, an anomaly event alert may be generated and/or transmitted to a user interface—for example, by means of a processor implemented alert engine.

In a preferred embodiment of the invention, the first processor implemented classifier model is different from the second processor implemented classifier model in terms of one or more of run time overhead, communication overhead, data transfer overhead, size overhead, encoding overhead, data structure overhead, or run time complexity. In a more preferred embodiment of the invention, the second processor implemented classifier model has a higher run time overhead, higher communication overhead, higher data transfer overhead, higher size overhead, higher encoding overhead, higher data structure overhead, and/or higher run time complexity in comparison with the first processor implemented classifier model.

In another embodiment of the invention, the first processor implemented classifier model is different from the second processor implemented classifier model in terms of one or more of classification accuracy, classification precision, classification sensitivity, F-score, classification specificity, area under the curve (AUC), average accuracy and/or error rate. In a more preferred embodiment of the invention, the second processor implemented classifier model has a higher classification accuracy, higher classification precision, higher classification sensitivity, higher F-score, higher AUC, higher average accuracy and/or lower error rate in comparison with the first processor implemented classifier model.

In an embodiment of the invention, selection of classifier models for implementation on an edge node and on a centralized server respectively may involve a configuration process. In an embodiment, the configuration process may include the steps of (i) calculating computational overheads involved in implementing each of two identified classifier models, (ii) determining which of the two identified classifier models involves a lower computational overhead and implementing the classifier model involving a lower computational overhead at the edge node, and (iii) implementing the classifier model involving a higher computational overhead at the centralized server. In an embodiment, the computational overhead calculated in respect of each classifier model may take into account any one or more of run time overhead, communication overhead, data transfer overhead, size overhead, encoding overhead, data structure overhead, and run time complexity. In a more preferred embodiment, the computational overhead calculated in respect of each classifier model may take into account (i) at least one of run time overhead, size overhead, encoding overhead and data structure overhead, and (ii) at least one of communication overhead and data transfer overhead—associated with implementing each of the two identified classifier models at each of the edge node and the centralized server. A decision on which of the two identified classifier models to implement at the edge node, and which to implement at the centralized server may be determined based on identification of an implementation having the lowest overall computational overhead.

In an embodiment of the invention, the first processor implemented classifier model is a machine learning ensemble based classifier implemented within the edge node. In a further embodiment, the second processor implemented classifier model is a deep learning architecture based classifier implemented within the centralized server. In a particular embodiment, the first processor implemented classifier model is a random forest classifier, while the second processor implemented classifier model is a convolutional neural network. In yet another embodiment of the invention, the centralized server may be located in a computing cloud environment.

In an embodiment of the invention, the second set of field device data transmitted to the second anomaly detector at step 404 is selected based on timestamps associated with said second set of field device data. The second set of field device data may be selected based on a determination that it was generated (i) at the same time as the first set of field device data, or (ii) at the same time as the time at which at least one data item within the first set of field device data was generated or (iii) within a predefined time window encapsulating the time at which at least one data item within the first set of field device data was generated.

In a specific embodiment of the method of FIG. 4, device data generated by the second set of field device data is transmitted to and analyzed by the second anomaly detector, only in response to detection of an anomaly event by the first anomaly detector.

In an embodiment of the invention, the information generated by the first set of field devices is used to generate a first input vector—which first input vector is processed by the first anomaly detector for the purpose of detecting anomaly events/error states. The information generated by the second set of field devices may be used to generate a second input vector—which second input vector is processed by the second anomaly detector for the purpose of detecting anomaly events/error states. In a further embodiment, the first input vector and the second input vector are different from each other.

It has been found that since one or more computing overheads associated with machine learning ensemble based classifiers (such as a random forest classifier) are smaller than corresponding computing overheads associated with deep learning architecture based classifiers, machine learning ensemble based classifiers can be efficiently implemented within edge nodes. This ensures that despite having lower computing capabilities, such edge nodes are capable of implementing said machine learning ensemble based classifiers. Simultaneously, by providing for a confirmatory determination of an anomaly event by a deep learning architecture based classifier implemented at a cloud based centralized server, the invention avoids significant loss of accuracy, and in several situations has been found to result in observable improvements in accuracies associated with detection and classification of anomaly events and/or error states. Additionally, in embodiments where device data generated by the second set of field device data is transmitted to and analyzed by the second anomaly detector only in response to detection of an anomaly event by the first anomaly detector, the invention ensures a significant reduction in communication overheads.

In a particular embodiment of the invention, the first processor implemented classifier model is configured to detect anomaly events/error states based on the first set of field device data, while the second processor implemented classifier model is configured to identify (based on the second set of field device data) the specific anomaly event type or error state type associated with the detected anomaly event/error state. In a yet more particular embodiment, the first processor implemented classifier model does not identify the specific anomaly event type or error state type associated with the detected anomaly event/error state.

Figure 5:
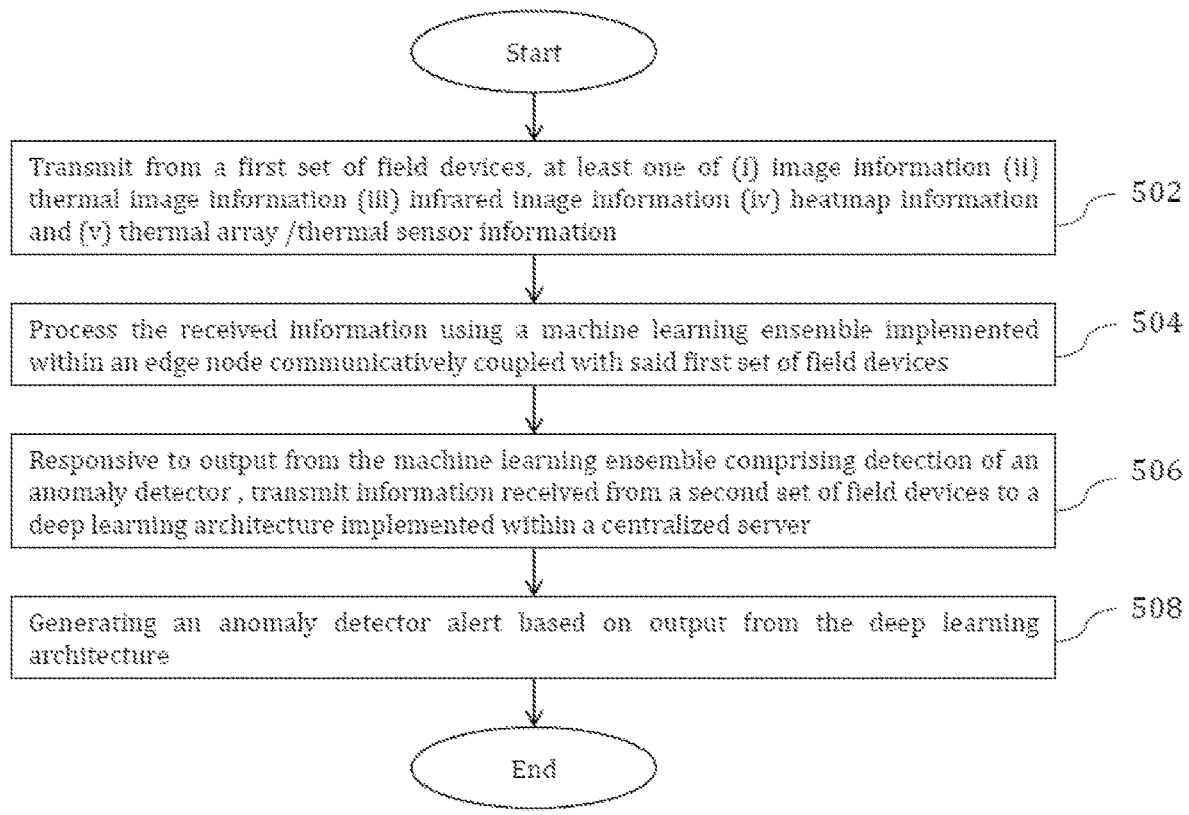

FIG. 5 illustrates a more specific embodiment of the method generally described with reference to FIG. 4.

Step 502 comprises receiving from a first set of field devices, at least one of (i) image information, (ii) thermal image information, (iii) infrared image information, (iv) heat map information and (v) thermal array/thermal sensor information. In an embodiment, the first set of field devices comprises one or more thermal imagers or infrared imagers or arrays of thermal sensors or arrays of infrared sensors, and the information received from said first set of field devices includes at least one feature vector comprising temperature values received from a plurality of thermal sensors/infrared sensors.

Step 504 comprises processing the received information using a first classifier model comprising a machine learning ensemble implemented within an edge node communicatively coupled with said first set of devices. In an embodiment, input to the first classifier model comprises at least one feature vector comprising temperature values received from an array of thermal sensors/infrared sensors.

The first classifier model may be configured to detect one or more anomaly events within a process environment. In an embodiment, the first classifier model may additionally be configured to classify the detected one or more anomaly events into one of a predefined set of anomaly types. In an alternate embodiment, the first classifier model does not identify an anomaly type corresponding to the detected anomaly event.

At step 506, responsive to output from the machine learning ensemble representing detection of an anomaly event (i.e. responsive to the machine learning ensemble detecting an anomaly event), information received from a second set of field devices is transmitted to a deep learning architecture implemented within a centralized server. In an embodiment, the second set of field devices comprises one or more thermal imagers or infrared imagers, and the information received from said second set of field devices includes one or more infrared images, thermal images or heat maps. The information received from the second set of field devices at the deep learning architecture may thereafter be processed for a determination regarding confirmatory identification of any anomaly event or error state, and/or identification of an anomaly type or error state type.

In a specific embodiment of step 506, device data generated by the second set of field device data is transmitted to and analyzed by the deep learning architecture only in response to detection of an anomaly event or error state by the machine learning ensemble. In an embodiment, input to the deep learning architecture comprises at least one thermal image, infrared image or heat map.

As in the case of FIG. 4, the second set of field device data transmitted to the deep learning architecture at step 506 is selected based on timestamps associated with said second set of field device data. The second set of field device data may be selected based on a determination that it was generated (i) at the same time as the first set of field device data, or (ii) at the same time as the time at which of at least one data item within the first set of field device data was generated or (iii) within a predefined time window encapsulating the time at which at least one data item within the first set of field device data was generated.

In a specific embodiment of the invention, the device data transmitted to the deep learning architecture at step 506 comprises at least one of (i) image information, (ii) thermal image information, (iii) infrared image information, (iv) heat map information and (v) thermal array/thermal sensor information. In a yet more specific embodiment, the device data transmitted to the deep learning architecture at step 506 comprises is of a device data type that is different from a device data type of data previously processed by the machine learning ensemble at step 504.

In a particular embodiment of the method of FIG. 5, the device data processed by the machine learning ensemble at step 504 is data generated by at least one of a thermal imager, an infrared image, a heat map generating array, a thermal array or one or more thermal sensors. In a further embodiment, the device data processed by the deep learning architecture at step 506 comprises data having a data type different from the device data processed at step 504.

Step 508 comprises generating an anomaly event alert based on output from the deep learning architecture. In a preferred embodiment, the anomaly event alert is generated responsive to output from the deep learning architecture representing detection of an anomaly event or error state based on data received from the second set of field devices.

In an embodiment of the invention, the machine learning ensemble is a random forest classifier. In further embodiment, the deep learning architecture is a convolutional neural network.

Figure 6:
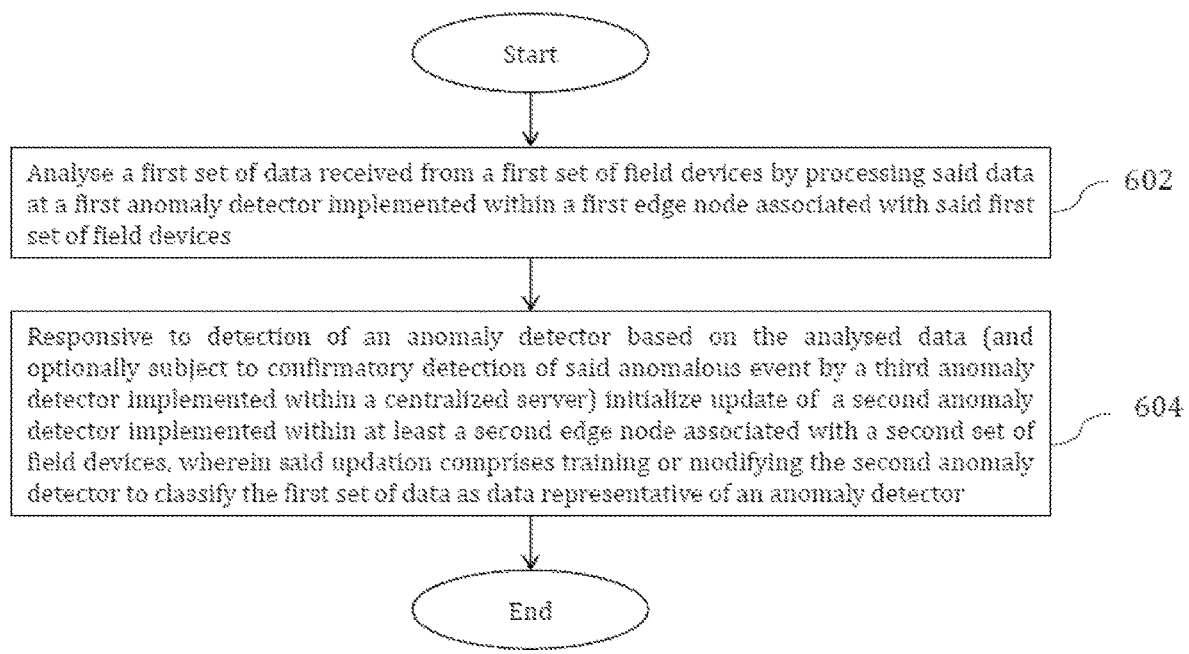

FIG. 6 illustrates a method embodiment in accordance with the present invention. The method of FIG. 6 may be understood in the context of a system having configurations in accordance with the teachings of FIG. 4 or 5, but additionally having multiple edge nodes, wherein (i) each edge node has a processor implemented classifier model implemented thereon, (ii) each edge node is configured to control, and receive data from, a corresponding set of field devices/sensors and (iii) each edge node is in network communication with a cloud based centralized server—wherein said cloud based centralized server has a processor implemented classifier model implemented thereon. In a specific embodiment, each edge node implemented classifier model is a machine learning ensemble based classifier, while the centralized server implemented classifier model is a machine learning architecture based classifier.

Each of the edge node implemented classifiers and the centralized server implemented classifier may be configured in accordance with the teachings discussed above in connection with FIGS. 4 and 5. Additionally, each edge node classifier may be configured to detect and/or classify anomaly events corresponding to one or more anomaly event types. In one embodiment, at least a first edge node classifier and a second edge node classifier (each implemented within corresponding first and second edge nodes) are configured to detect and/or classify anomaly events of the same anomaly event type.

Step 604 of FIG. 6 thereafter comprises responding to detection of an anomaly event by a first anomaly detector (implemented at a first edge node) based on a first set of data received from a corresponding first set of field devices, by initializing the process of updating or modifying the configuration of a second anomaly detector implemented at a second edge node. In an embodiment of the invention, the step of updating or modifying the configuration of the second anomaly detector comprises training said second anomaly detector or modifying the configuration of said second anomaly detector, such that the updated or modified second anomaly detector identifies data parameters of the first set of data as representative of an anomalous event (i.e. the second anomaly detector is trained to classify the first set of data as data representative of an anomalous event). In a further embodiment of the invention, the step of updating or modifying the configuration of the second anomaly detector comprises training said second anomaly detector or modifying the configuration of said second anomaly detector—such that the updated or modified second anomaly detector classifies the first set of data as being representative of the same anomaly event type that has been identified by the first anomaly detector. In an embodiment, updating the second anomaly detector comprises altering or modifying the classification parameters of the classifier model implemented within the second anomaly detector.

In a preferred embodiment of the method, the step of updating or modifying configuration of the second anomaly detector is initiated responsive to a third anomaly detector implemented within a centralized server confirming detection of the anomaly event detected by the first anomaly detector.

It would be understood that by implementing the method of FIG. 6, data representing an anomaly event that is received from field devices at one edge node can be used as training data for other edge nodes, to ensure that such other edge nodes are capable of detecting said anomaly event as well.

Figure 7:
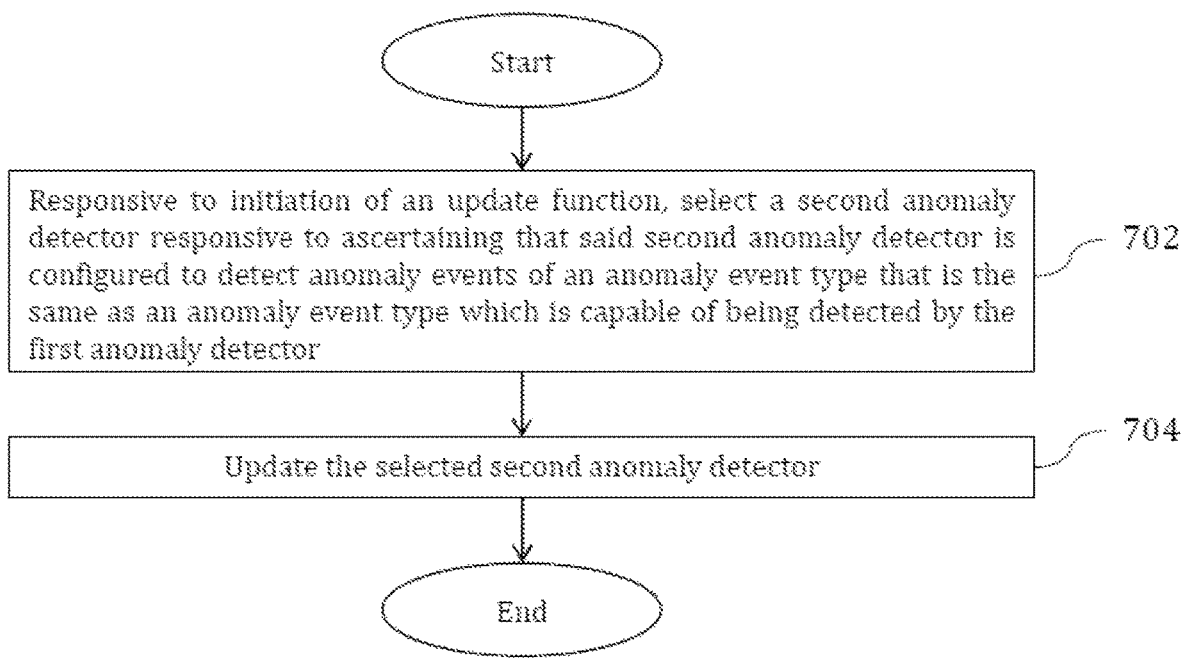

FIG. 7 illustrates specific method steps relating to the method more generally discussed in connection with FIG. 6—in particular, providing a method for selecting one or more edge node(s) whose anomaly detector(s) would be updated or modified in accordance with the teachings discussed in connection with method step 604.

Step 702 comprises responding to initiation of an update step or configuration modification step (for example at step 604) by identifying a second anomaly detector that is configured to detect anomaly events corresponding to a specified class of anomaly event types—wherein the specified class of anomaly event types is capable of being detected by the first anomaly detector as well. In a more preferred embodiment, step 702 comprises responding to initiation of an update step or configuration modification step (at step 604) by identifying a second anomaly detector that is configured to detect anomaly events of the same anomaly type as the anomaly event that has been detected by first anomaly detector. For example, assuming that step 602 of the method of FIG. 6 comprises analysis of a first set of data and results in detection of a carbon dioxide leakage, step 702 would result in selection and updating of a second anomaly detector that is also configured to identify carbon dioxide gas leaks.

Step 704 thereafter comprises updating the selected second anomaly detector in accordance with the teachings of method step 604.

Figure 8:
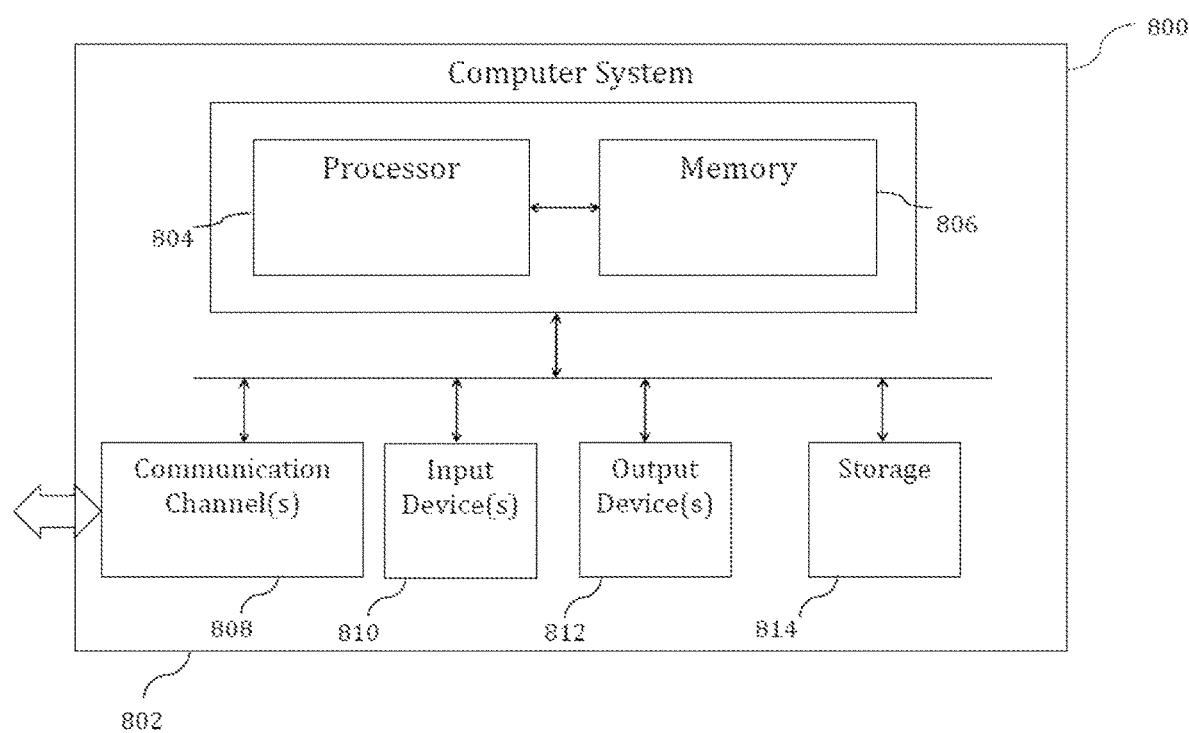
FIG. 8 illustrates an exemplary computing system in which various embodiments of the invention may be implemented.

FIG. 8 illustrates an exemplary system for implementing the present invention.

The computing system 802 comprises one or more processors 804 and at least one memory 806. Processor 804 is configured to execute program instructions—and may be a real processor or a virtual processor. It will be understood that computer system 802 does not suggest any limitation as to scope of use or functionality of described embodiments. The computer system 802 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 802 in accordance with the present invention may include one or more servers, desktops, laptops, tablets, smart phones, mobile phones, mobile communication devices, tablets, phablets and personal digital assistants. In an embodiment of the present invention, the memory 806 may store software for implementing various embodiments of the present invention. The computer system 802 may have additional components. For example, the computer system 802 may include one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various software executing in the computer system 802 using a processor 804, and manages different functionalities of the components of the computer system 802.

The communication channel(s) 808 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 810 may include, but is not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 802.

The storage 814 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 may contain program instructions for implementing any of the described embodiments.

In an embodiment of the present invention, the computer system 802 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions that is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The present invention accordingly offers efficient methods for detecting anomaly events or error states in process control environments, through new approaches to machine intelligence based detection of anomalies and/or error states. The invention additionally provides improvements to accuracies offered by machine intelligence based anomaly detection while simultaneously reducing the overall computing overheads involved in such detection.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A method for process control anomaly detection in process control environments, the method comprising:
   receiving a first set of information from a first set of field devices located within a process control environment in an industrial plant;
   receiving by a first anomaly detector implemented within an edge node configured to provide gateway access to said process control environment, a first input vector comprising temperature values generated based on the first set of information;
   detecting, by the first anomaly detector that implements a first classifier model, a first anomaly event based on the first input vector;
   responsive to the first anomaly detector detecting the first anomaly event, determining a second anomaly detector that is implemented within a cloud based server that is communicatively coupled to the edge node, that implements a second classifier model having a computing complexity higher than a computing complexity of the first classifier model, and that is configured to detect anomaly events of a same anomaly type as the detected first anomaly event;
   transmitting, to the determined second anomaly detector, a second input vector that is generated based on a second set of information from a second set of field devices located within the process control environment;
   detecting, by the second anomaly detector, a second anomaly event based on the second input vector; and
   generating an anomaly event alert responsive to the second anomaly event.

2. The method as claimed in claim 1, wherein the computing complexity of the second classifier model is higher than that of the first classifier model in terms of any one or more of classification accuracy, classification precision, classification sensitivity, F-score, classification specificity, area under the curve, average accuracy or error rate.

3. The method as claimed in claim 1, wherein the computing complexity of the second classifier model is higher than the computing complexity of the first classifier model in terms of any one or more of run time overhead, communication overhead, data transfer overhead, size overhead, encoding overhead, data structure overhead, or run time complexity.

4. The method as claimed in claim 1, wherein the first classifier model is a machine learning ensemble based classifier model.

5. The method as claimed in claim 4, wherein the machine learning ensemble based classifier model is a random forest classifier.

6. The method as claimed in claim 4, wherein the second classifier model is a deep learning architecture based classifier model.

7. The method as claimed in claim 6, wherein the deep learning architecture based classifier model is a convolutional neural network.

8. The method as claimed in claim 1, wherein:
the first input vector comprises the temperature values received from a plurality of thermal sensors or infrared sensors; and
the second input vector comprises image information.

9. The method as claimed in claim 8, wherein the image information represents any one of a thermal image, an infrared image or a heat map.

10. A method for configuring an anomaly detection system for process control environments, the system comprising at least a first processor implemented classifier model located at a first edge node, a second processor implemented classifier model located at a second edge node, and a third processor implemented classifier model located at a cloud based central server, wherein each of said first, second and third processor implemented classifier models is configured to detect anomaly events within process control environments, each of the anomaly events being a same type of anomaly event, the method comprising:
receiving a first set of information from a first set of field devices located within a process control environment in an industrial plant;
transmitting a first input vector comprising temperature values generated based on the first set of information, to the first processor implemented classifier model located at the first edge node; and
responsive to the first processor implemented classifier model detecting an anomaly event based on the transmitted first input vector, modifying the classification parameters of the second processor implemented classifier model to train the second processor implement classifier model to detect an anomaly event of a same type as the detected anomaly event.

11. The method as claimed in claim 10, wherein modification of the classification parameters of the second processor implemented classifier model is subject to the third processor implemented classifier model detecting an anomaly event within said process control environment.

12. The method as claimed in claim 10, wherein the classification parameters of the second processor implemented classifier model are modified such that the second processor implemented classifier model is configured to detect the anomaly event in response to receiving the first input vector as an input to the second processor implemented classifier model.

13. A system for anomaly detection in process control environments, the system comprising:
at least one processor implemented edge node configured to provide gateway access to a process control environment in an industrial plant;
at least one cloud based server that is communicably coupled to the at least one processor implemented edge node; and
a processor implemented alert engine,
wherein the at least one processor implemented edge node is configured to:
receive a first set of information from a first set of field devices located within the process control environment in the industrial plant;
detect, by a first anomaly detector that is implemented within said processor implemented edge node and that implements a first classifier model, a first anomaly event according to a first input vector comprising temperature values generated based on the first set of information,
based on the first anomaly detector detecting the first anomaly event, determine a second anomaly detector that is implemented within said at least one cloud based server, that implements a second classifier model having a complexity higher than a complexity of the first classifier model, and that is configured to detect anomaly events of a same anomaly type as the detected first anomaly event, and
transmit, to the determined second anomaly detector that is implemented within said at least one cloud based server, a second input vector that is generated based on a second set of information received from a second set of field devices located within the process control environment,
wherein said at least one cloud based server is configured to:
detect, by the second anomaly detector implemented within the at least one cloud server, a second anomaly event based on the second input vector,
wherein the processor implemented alert engine is configured to generate an anomaly event alert responsive to the second anomaly event.

14. The system as claimed in claim 13, wherein the computing complexity of the second classifier model is higher than the computing complexity of the first classifier model in terms of any one or more of classification accuracy, classification precision, classification sensitivity, F-score, classification specificity, area under the curve, average accuracy or error rate.

15. The system as claimed in claim 13, wherein the computing complexity of the second classifier model is higher than the computing complexity of the first classifier model in terms of any one or more of run time overhead, communication overhead, data transfer overhead, size overhead, encoding overhead, data structure overhead, or run time complexity.

16. The system as claimed in claim 13, wherein the first classifier model is a machine learning ensemble based classifier model.

17. The system as claimed in claim 16, wherein the machine learning ensemble based classifier model is a random forest classifier.

18. The system as claimed in claim 16, wherein the second classifier model is a deep learning architecture based classifier model.

19. The system as claimed in claim 18, wherein the deep learning architecture based classifier model is a convolutional neural network.

20. The system as claimed in claim 13, wherein:
the first input vector comprises the temperature values received from a plurality of thermal sensors or infrared sensors; and
the second input vector comprises image information.

21. The system as claimed in claim 20, wherein the image information represents any one of a thermal image, an infrared image or a heat map.

* * * * *